Feb. 27, 1973 HIDEO NOMURA 3,717,947
FISHING DEVICE

Filed March 24, 1971 2 Sheets-Sheet 1

INVENTOR
HIDEO NOMURA

BY KARL W FLOCKS

ATTORNEY

3,717,947
FISHING DEVICE
Hideo Nomura, Chigasaki-shi, Japan, assignor to Miyata Industry Co., Ltd., Chigasaki-shi, Japan
Filed Mar. 24, 1971, Ser. No. 127,636
Claims priority, application Japan, Dec. 8, 1970, 45/108,264, 45/121,712; Dec. 28, 1970, 46/132,761
Int. Cl. A01k 91/02
U.S. Cl. 43—19                                 7 Claims

ABSTRACT OF THE DISCLOSURE

A fishing device comprising a fishing rod and a fluid pressure-actuated tool for casting a sinker and an associated line. The tool has a bore for receiving a neck portion of a small-sized bomb which contains a pressurized gas. The bore is in communication with a pressure storage chamber which is normally out of communication with the interior of a barrel to be loaded with the sinker. A valve located within the storage chamber is operable by a trigger and is employed to control the communication between the pressure storage chamber and the barrel. The valve also has a spring biased portion which passes through the breach plug member closing the rearward end of the pressure storage chamber.

BACKGROUND OF THE INVENTION

Field of the invention

The present invention relates to a fishing device which utilizes a gas under pressure to cast a sinker together with an associated line and a hook.

In fishing with a fishing rod, an angler holds the rod at the gripping portion thereof and strongly swings the rod so that the sinker is cast together with the line and the hook due to the swing and the resiliency of the rod. Such operation must be repeated many times. This requires a great amount of power and thus tires the angler. In a case where the angler casts the line from a dangerous rocky seashore or from a crowded beach into the water, a great care must be given so that he does not slip down and the casting does not injure other anglers. In such case, moreover, it will be difficult for an angler to cast the line over a desired longer distance.

SUMMARY OF INVENTION

It is a primary object of the present invention to provide a fishing device which eliminates the above-discussed problems and difficulty.

It is another object of the present invention to provide a fishing device which utilizes a tool operable by a pressurized gas to cast a sinker and an associated fishing line and a hook.

According to the present invention, there is provided a fishing device comprising a fishing rod and a tool mechanically connected thereto for shooting a sinker and an associated line and a hook, said shooting tool having a barrel member for removably receiving said sinker together with a part of said line, a cylindrical hollow member having a forward end portion secured to said barrel member, a breech plug member secured to the rearward end of said cylindrical member for defining therewith a pressure storage chamber adapted to be supplied with a pressurized fluid from a fluid pressure source, a passage between said pressure storage chamber and the interior of said barrel member, a valve means within said pressure storage chamber movable between a first position in which said valve means closes said passage and a second position in which said valve means opens said passage to communicate said pressure storage chamber with the interior of said barrel member, means normally retaining said valve means in said first position, spring means disposed rearwardly of said breech plug member for biasing said valve means from said first position toward said second position, and a trigger means for allowing said spring means to expand so as to cause said valve means to be moved from said first position to said second position.

Other objects and features of the present invention will be made apparent from the following description with reference to the accompanying drawings.

DESCRIPTION OF PREFERRED EMBODIMENTS

Figure 1:
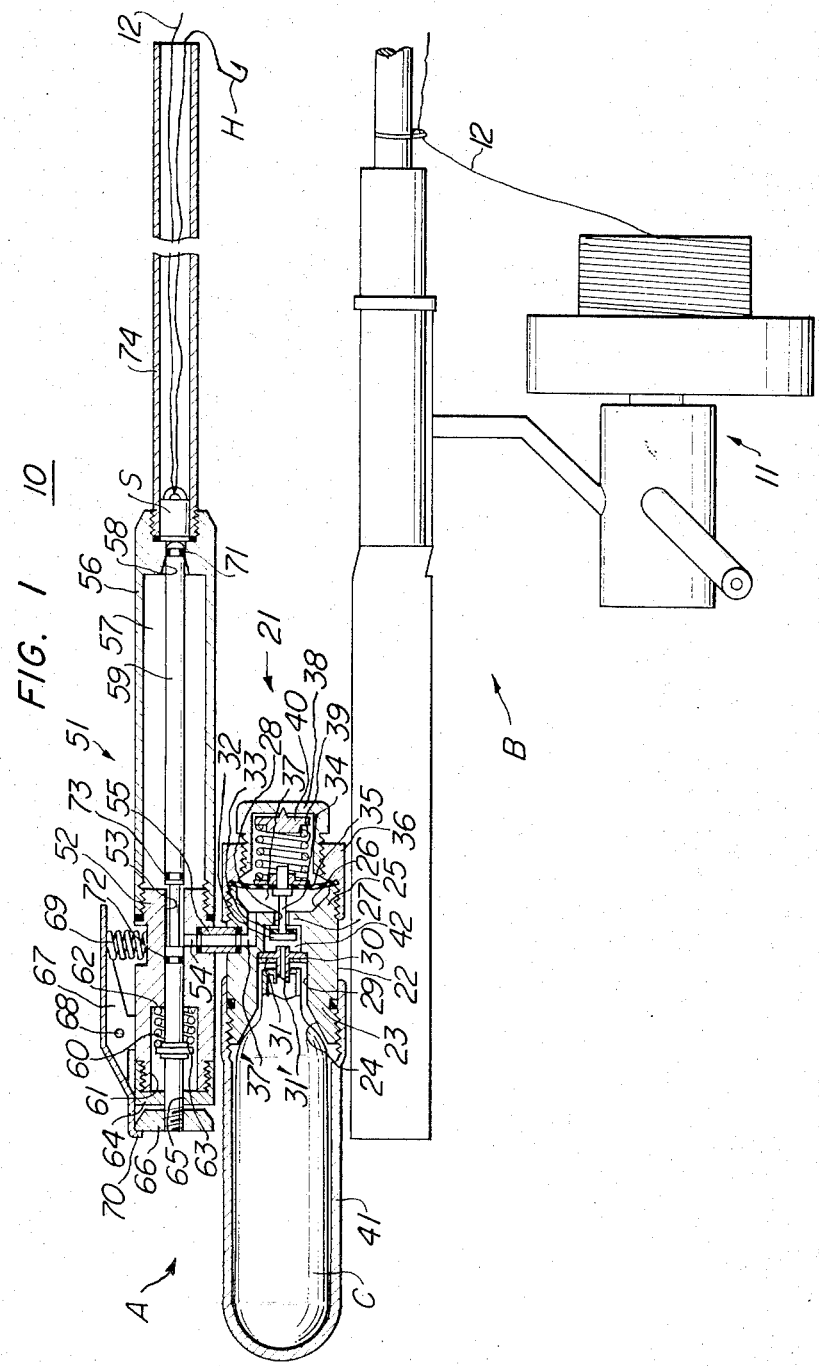
FIG. 1 is a longitudinal sectional view of one embodiment of the sinker casting tool according to the present invention with the tool being shown in its shoot preparing position.
Figure 2:
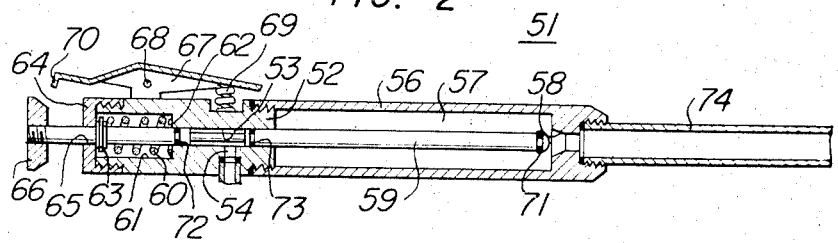
FIG. 2 illustrates in longitudinal section a part of the tool shown in FIG. 1 when the part is in its shot position.

Referring to FIGS. 1 and 2 of the drawings, the fishing device according to one embodiment of the present invention comprises a shooting or casting tool generally indicated at A and a fishing rod means, generally indicated at B, detachably secured to the casting tool by appropriate securing means not shown. The rod means B is preferably equipped with a conventional reel means 11 adapted to carry thereon convolutions of a line 12.

The casting tool A comprises a pressure source section 21 and a shooting section 51 rigidly connected to the pressure source section 21 by an appropriate mechanical connection (not shown) and also pneumatically connected to the section 21 in the manner to be described later.

The pressure source section 21 includes a generally cylindrical block 22 having a rear end portion 23 formed therein with a rearwardly opening axial bore 24. The block 22 is also formed at its forward end portion 25 with a forwardly opening axial bore 26 axially spaced from the rear bore 24 by a partition 27 which, in the illustrated embodiment of the invention, is integral with the block 22. The partition 27 is formed with a central axial passage 28 for the purpose to be described later.

The rear bore 24 has a reduced or small diameter forward end portion 29 providing a rearwardly facing annular shoulder 30. A disc member 31 having an axially rearwardly directed hollow needle 31' is snugly received in the rear bore 24 in abutting engagement with the annular shoulder 30.

A disc-like valve 32 backed up by a disc-like sealing member 33 is mounted in the reduced diameter bore portion 29 for axial sliding movement. The valve 32 has a stem 34 axially forwardly extending loosely through the axial passage 28 in the partition 27. The stem 34 is connected at the forward end with a diaphragm 35 which is hermetically secured at the periphery thereof to the forward end face of the block 22 by means of a fastening member 36 screwed over the forward end portion 25 of the block 22. It will be appreciated that the forward bore 26, the partition 27 and the diaphragm 35 cooperate together to define a chamber 37 which is in communication with the shooting section 51 by means of a second passage 37'.

A cap member 38 is adjustably screwed into the fastening member 36 and houses an axial compression spring 39 having an inner end in pressure contact with the outer surface of the diaphragm 35 while the outer end of the spring 39 is supported by a spring retainer 40 axially and radially supported by the end wall of the cap member 38 and rotatable relative to the same.

A generally cylindrical housing 41 is detachably and advantageously hermetically mounted on the rearward portion 23 of the block 22 by appropriate conventional mounting and sealing means such as screw threads and an O-ring. The housing is adapted to protectively house and hold high-pressure container or bomb C containing a pressurized gas such as liquified carbonic acid gas. The housing 41 is dimensioned such that, when the housing with a gas bomb received therein is substantially completely tightened against the rearward portion 23 of the block 22, the closure of the bomb is urged against the hollow needle 31' so as to be pierced thereby so that the interior of the bomb is communicated through the hollow needle 31' with a small chamber 42 defined by the reduced diameter bore portion 29.

The shooting section 51 includes a breech plug member 52 formed therein with an axial bore 53 and a radial bore or passage 54 directly connected with the axial bore 53 and communicated with the passage 37' in the block 22 by means of a short conduit 55.

The breech plug member 52 has a forward end portion sealingly connected with a cylindrical hollow member 56 defining a pressure storage chamber 57 which is closed at its forward end excepting a restricted axial bore 58 which is in axial alignment with the axial bore 53. A spool valve 59 extends axially through the bore 58, the pressure storage chamber 57 and the axial bore 53 and axially rearwardly therefrom for limited axial movement. For this purpose, a compression spring 60 is provided to extend around the portion of the spool valve 59 extending axially rearwardly from the bore 53 and is received in a rearwardly opening axial bore 61 of a diameter larger than that of the bore 53. The spring 60 has its forward end in pressure contact with an annular shoulder 62 defined between the small and large diameter bores 53 and 61 while the rearward end of the spring 60 is in abutting engagement with a spring retainer 63 rigidly mounted on the rear end portion of the spool valve 59.

The rearward end extremity of the breech plug member 52 is preferably closed by a cap member 64 which is formed therein with a central axial opening 65 through which the rear end portion of the spool valve 59 slidably extends further rearwardly. A forwardly tapered disc-like member 66 is rigidly mounted on the rear end extremity of the spool valve 59 for the purpose to be described later.

A lever or trigger member 67 is pivotally mounted by a pivot pin 68 on the breech plug member 52 and is biased in counter-clockwise direction by a compression spring 69 disposed between the forward end portion of the trigger member 67 and the breech plug member 52. The trigger member 67 has an inwardly turned rearward end 70 forming a spool valve retaining means which is adapted to be normally in engagement with the disc-like member 66 of the spool valve 59 so that the latter is normally held against the compression spring 60 in a forward position in which the forward end of the spool valve extends into the restricted bore 58 in the forward end of the pressure storage chamber 57, as shown in FIG. 1. The forward end of the spool valve 59 is formed with an annular groove in which is fitted an annular sealing ring 71 which, in the forward position of the spool valve 59, is operable to seal a fine annular gap defined between the bore 58 and the peripheral surface of the spool valve 59.

In that portion of the spool valve 59 which is positioned rearwardly of the opening of the radial passage 54 into the axial bore 53 when the spool valve is in its forward position, the valve 59 is also formed with a second annular groove in which is fitted a second annular sealing ring 72 which prevents rearwardly outward leakage of pressurized gas.

The spool valve 59 is further formed with a third annular groove in which is fitted a third annular sealing ring 73 which is spaced from the forward end face of the breech plug member 52 in the forward position of the spool valve 59, as will be seen in FIG. 1, to communicate the pressure storage chamber 57 with the chamber 37 in the forward end portion 25 of the block 22.

It will be appreciated that if the trigger member 67 is actuated against the compression spring 69, the spool valve retainer 70 is radially outwardly moved to release the disc-like member 66 on the spool valve 59, thus allowing the compression spring 60 to axially rearwardly expand so that the spool valve 59 is axially rearwardly moved to a position in which the forward end of the valve 59 and the sealing ring 71 are retracted rearwardly from the restricted bore 58 and the third annular sealing ring 73 is rearwardly moved into sealing engagement with the forward end portion of the axial bore 53 to shut off the communication between the chambers 37 and 57, as shown in FIG. 2.

At its forward end, the cylindrical member 56 is connected with a barrel member 74 which is adapted to receive a sinker S having a line anchoring means. The length of the line 12 delivered from the reel 11 is caused to extend along the fishing rod and, then, is secured to the sinker S with which the shooting tool is loaded. Another shorter length of line is connected at one end with the sinker S and with a hook H at the other end, the hook being left outside the barrel 74 when the sinker S is inserted thereinto, as shown in FIG. 1.

In operation, the compression spring 39 is adjusted by the cap 38 such that, when the pressure in the chamber 37 is lower than the pressure in the chamber 42, the diaphragm 35 is displaced rearwardly by the spring 39 so as to cause the disc-like valve 32 and the sealing member 33 to be spaced rearwardly from the partition 27. In this position of the valve 32, the pressurized gas discharge from the bomb into the chamber 42 is allowed to flow through an annular space or passage defined between the peripheries of the valve 32 and the sealing member 33 and the inner surface of the bore portion 29 and through the annular space defined between the bore 28 and the valve stem 34 into the chamber 37. As the pressure in the chamber 37 increases, the diaphragm 35 is gradually displaced outwardly or forwardly against the compression spring 39 until the disc-like valve 32 and the sealing member 33 are forwardly moved into sealing engagement with the partition 27 to close the bore 28.

The chamber 37 is in communication with the pressure storage chamber 57 through the passage 37', conduit 55, radial passage 54 and an annular passage defined between the spool valve 59 and the inner surface of the axial bore 53. The portion of the spool valve 59 between the second and third sealing ring 72 and 73 is reduced in diameter to provide an increased cross-sectional area for the annular passage between the valve 59 and the axial bore 53.

When the spool valve 59 is moved axially rearwardly from the FIG. 1 position to FIG. 2 position in the manner described in the above, the pressurized gas in the chamber 57 rushes from the chamber through the bore 58 upon the sinker S so that the same is strongly driven away from the barrel 74 together with the hook H and the length of the line. At the same time, the third sealing ring 73 on the spool valve 59 is brought into sealing engagement with the cylindrical inner surface of the axial bore 53 in the breech plug member 52 to shut off the communication between the chambers 37 and 57 so that the pressure within the chamber 37, passage 37', radial and axial bores 54 and 53 is hindered from flowing into the chamber 57.

When a next shoot is required, the disc-like member 66 on the rearward end of the spool valve 59 may be pushed forwardly against the compression spring 60. In the course of this forward movement of the member 66, it will be first brought into contact with the rear surface of the hook 70 but it will be appreciated that the forwardly tapered surface of the member 66 will easily lift the hook 70 or rotate the trigger member 67 in clockwise direction about the pivot pin 68 against the compression spring 69 therefor. As soon as the disc-like member 66 is moved past the hook 70, the latter is moved down into locking engagement with the rear end face of the member 66 by the spring 69. At this time, the sealing ring 71 on the forward end of the spool valve 59 is moved into sealing engagement with the bore 58 at the forward end of the pressure storage chamber 57 while the sealing ring 73 is moved forwardly out of sealing engagement with the axial bore 53 to cause the chamber 37 to again communicate with the chamber 57. This causes a pressure drop within the chamber 37 so that the compression spring 39 will displace the diaphragm 35 inwardly to move the valve 32 and the sealing member 33 out of contact with the partition 27, with a result that the gas is again fed under pressure to the chamber 37 and thence to the pressure storage chamber 57 until the valve 32 again closes the passage 28 due to pressure rise within the chamber 37. It will be appreciated that the cap 38 may be utilized to appropriately adjust the force of the spring 39 and, hence, the closing of the passage 28 by the valve 32 so that there is obtained in the pressure storage chamber 57 an appropriate pressure build-up necessary for a desired line-casting.

Figure 3:
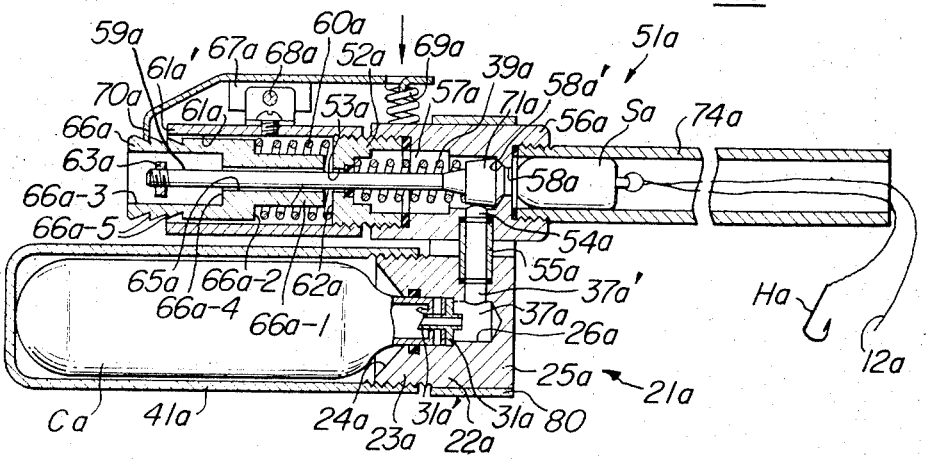
FIG. 3 is a longitudinal sectional view of another embodiment of the sinker casting tool according to the present invention with the tool being shown in its shoot preparing position.
Figure 4:
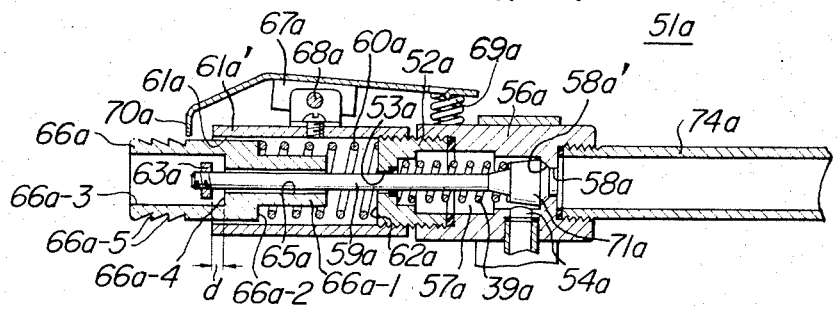
FIG. 4 illustrates in longitudinal section a part of the tool shown in FIG. 3 when the part is in its shot position.

Referring now to FIGS. 3 and 4, there is shown a modification, generally indicated at 10a, of the shooting tool of the fishing device according to the present invention. The parts corresponding in structure and in function to those in the preceding embodiment are indicated by similar reference numerals followed by a character "a."

The gaseous pressure in a bomb Ca is delivered therefrom through a hollow needle 31a' directly into a chamber 37a formed in a block 22a. The forward end of the chamber 37a is closed by the material of the block 22a. The chamber 37a is always in communication with a pressure storage chamber 57a in a cylindrical member 56a of the shooting section 51a through a radial passage 37a' in the block 22a, a short conduit 55a between the block 22a and the cylindrical member 56a, and a radial passage 54a in the wall of the member 56a.

The cylindrical member 56a is formed with a forward restricted axial bore 58a having a rearwardly diverging annular valve seat 58a' which is adapted to receive a valve head 71a having its valve stem 59a. The rearward end of the pressure storage chamber 57a is closed by a breech plug member 52a sealingly secured to the rear end of the cylindrical member 56a. Rearwardly of the breech plug member 52a is provided a rearwardly opening axial bore 61a by a sleeve member 61a' secured to the breech plug member 52a. The latter is formed with an axial bore 53a of a diameter smaller than the bore 61a to define an annular shoulder 62a. The valve stem 59a sealingly and slidably extends through the bore 53a rearwardly into the bore 61a.

A cylindrical plug 66a is loosely received in the bore 61a and on the rearward end portion of the valve stem 59a for limited axial sliding movement relative to the sleeve 61a' and the valve stem 59a. The plug 66a has its forward or inner portion 66a–1 reduced in diameter to provide a forwardly directed annular shoulder 66a–2. A compression spring 60a extends axially around the reduced diameter portion 66a–1 in pressure contact at the opposite ends with the shoulders 62a and 66a–2. The plug 66a is formed with a rearwardly opening bore 66a–3 having an annular bottom face or shoulder 66a–4 around an axial bore 65a in the plug 66a. The valve stem 59a rearwardly extends slidably through the bore 65a and has a stop 63a rigidly mounted on the stem 59a adjacent the rearward end extremity thereof.

The periphery of the rearward end portion of the plug 66a is formed with a series of annular grooves forming annular steps 66a–5 one of which is adapted to be selectively engaged by a hook 70a of a trigger member 67a pivotally mounted as at 68a on the sleeve member 61a'.

Within the pressure storage chamber 57a, a second compression spring 39a axially extends around the valve stem 59a between the breech plug member 52a and the valve head 71a in pressure contact therewith. The compression springs 60a and 39a are arranged such that, when they are in their freely expanded positions with the hook 70a not engaging any of the steps 66a–5, the spring 39a still causes the valve head 71a to close the bore 58a at the forward end of the pressure storage chamber 57a while the other spring 60a rearwardly displaces the plug 66a to a position in which the annular shoulder 66a–4 is slightly spaced a distance "d" from stop 63a as shown in FIG. 4.

A barrel 74a is mounted on the cylindrical member 56a in a manner similar to that in the preceding embodiment.

In operation, the plug 66a will be pushed down into the bore 61a against the compression spring 60a and the hook 70a will be brought into locking engagement with a selected one of the annular steps 66a–5. The pressure storage chamber 57a is already filled with a pressurized gas as at 60 kg./cm.$^2$, for example, supplied from the bomb Ca through the hollow needle 31a', small chamber 37a and passages 37a', 55a and 54a. The barrel 74a is loaded with a sinker Sa with a line 12a extending forwardly therefrom.

If the trigger member is depressed at the forward end against a compression spring 69a, the hook 70a at the end of the trigger member will be lifted up and disengaged from the step 66a–5 to allow the plug 66a to be violently moved rearwardly by the compression spring 60a toward the stop 63a on the valve stem 59a. It will be appreciated that, due to the inertia on the plug 66a, the latter will be driven against the stop 63a so that the valve stem 59a is caused to move rearwardly against the spring 39a, with a result that the valve head 71a is also moved away off the valve seat 58a' to allow the pressurized gas to rush through the bore 58a against the sinker Sa for violently driving the same away from the barrel 74a.

The energy on the plug will be consumed in moving the valve stem 59a and valve head 71a against the compression spring 39a and against the pressurized fluid within the pressure storage chamber 57a. Thus, the compression spring 39a and the fluid pressure within the chamber 57a will then return the valve head 71a again into sealing engagement with the valve seat 58a' to close the chamber 57a.

It will be noted that it is for a very minute or shorter period of time that the valve head 71a is spaced from the valve seat 58a'. In order to appropriately determined this period of time, the hook 70a of the trigger member 67a may be engaged with an appropriately selected one of the steps 66a–5 on the plug 66a to vary the force of the compression spring 60a so that the plug 66a may have a varied initial velocity of rearward movement by the spring. The variation in the period of time in question will result in a variation in the quantity of the mass of the pressurized fluid flow through the valve opening and, thus, in the variation in the distance over which the sinker Sa and the associated line will be cast. When one shot is completed, the components have their positions illustrated in FIG. 4. The plug 66a may be again pushed down to a shoot preparing position illustrated in FIG. 3 when desired.

What is claimed is:

1. A fishing device comprising a fishing rod and a tool mechanically connected thereto for shooting a sinker and an associated line and a hook, said shooting tool having a barrel member for removably receiving said sinker together with a part of said line, a cylindrical hollow member having a forward end portion secured to said barrel member, a breech plug member secured to the rearward end of said cylindrical member for defining therewith a pressure storage chamber adapted to be supplied with a pressurized fluid from a fluid pressure source, a passage between said pressure storage chamber and the interior of said barrel member, a valve means within said pressure storage chamber movable between a first position in which said valve means closes said passage and a second position in which said valve means opens said passage to communicate said pressure storage chamber with the interior of said barrel member, said valve means having a portion thereof extending rearwardly through said breach plug member, means normally retaining said valve means in said first position, spring means disposed rearwardly of said breech plug member for biasing said valve means from said first position toward said second position, and a trigger means for allowing said spring means to expand so as to cause said valve means to be moved from said first position to said second position.

2. A fishing device as defined in claim 1 in which said retaining means comprises an abutment member on said valve means adapted for releasable locking engagement by said trigger means.

3. A fishing device as defined in claim 1 in which said retaining means comprises a compression spring means disposed within said pressure storage chamber in pressure contact with said breech plug member and said valve means, said valve portion including a valve stem extending rearwardly from said breech plug member and having a tubular member mounted on said valve stem for a limited sliding movement relative to said valve stem, said first spring means rearwardly biasing said tubular member, said trigger means being adapted to have a releasable locking engagement with said tubular member, said valve stem having thereon a stop means for limiting the axial rearward movement of said tubular member by said first spring means for thereby transmitting said axial rearward movement of said tubular member to said valve means.

4. A fishing device as defined in claim 3, characterized by a bore for sealingly receiving a neck portion of a bomb containing a pressurized fluid, means in said bore for piercing the closure of said bomb, and a passage communicating said bore with said pressure storage chamber.

5. A fishing device as defined in claim 2, characterized by a bore for receiving a neck portion of a bomb containing a pressurized fluid, means in said bore for piercing the closure of said bomb, and a passage communicating said bore with said pressure storage chamber.

6. A fishing device as defined in claim 5, in which said valve means comprises a valve stem having a first valve portion adapted to close said passage between said pressure storage chamber and the interior of said barrel member when said valve means is in said first position and a second valve portion adapted to shut off the communication between said bore and said pressure storage chamber when said valve means is in said second position, said first valve portion being adapted to open said passage between said pressure storage chamber and the interior of said barrel member when said valve means is in said second position.

7. A fishing device as claimed in claim 6, characterized by a second chamber between said bore and said pressure storage chamber, a diaphragm defining a part of said second chamber, a spring member associated with said diaphragm, a second valve means between said bore and said second chamber, the arrangement being such that, when the pressure within said second chamber exceeds a predetermined value, said diaphragm is displaced by the fluid within said second chamber against said spring member so that said second valve means shuts off the communication between said bore and said second chamber.

References Cited
UNITED STATES PATENTS

| | | | |
|---|---|---|---|
| 2,864,197 | 12/1958 | Johnson | 43—19 |
| 2,924,211 | 2/1960 | McSwain | 43—19 X |
| 2,958,975 | 11/1960 | Neff et al. | 43—19 |
| 2,977,706 | 4/1961 | Merz | 43—19 |

ALDRICH F. MEDBERY, Primary Examiner

J. H. CZERWONKY, Assistant Examiner

U.S. Cl. X.R.

124—11 A, 31